United States Patent [19]

Haro

[11] Patent Number: 5,577,689
[45] Date of Patent: Nov. 26, 1996

[54] CONTAINER FOR AIR TRANSPORT

[76] Inventor: Jurgen Haro, Warteweg 7 + 46, 37627 Stadtoldendorf, Germany

[21] Appl. No.: 340,871

[22] Filed: Nov. 15, 1994

[30] Foreign Application Priority Data

Nov. 16, 1993 [DE] Germany .............. 43 39 052.8

[51] Int. Cl.⁶ .................................................. B64D 1/14
[52] U.S. Cl. ....................................................... 244/138 R
[58] Field of Search .............................. 241/138 R, 139, 241/140, 141, 142, 145, 113, 213

[56] References Cited

U.S. PATENT DOCUMENTS

| | | | |
|---|---|---|---|
| 2,712,913 | 7/1955 | Stanley | 244/138 R |
| 2,938,689 | 5/1960 | Rollings | 244/138 R |
| 2,964,139 | 12/1960 | Wittl et al. | 244/138 R |
| 3,212,730 | 10/1965 | Tschudy et al. | 244/138 R |
| 3,266,757 | 8/1966 | Guienne | 244/138 R |
| 3,387,805 | 6/1968 | Barnett et al. | 244/138 R |
| 3,433,441 | 3/1969 | Cummings et al. | 244/138 R |

*Primary Examiner*—Galen L. Barefoot
*Attorney, Agent, or Firm*—Whitham, Curtis, Whitham & McGinn

[57] ABSTRACT

A container for air transport and for deliberate drops, for which purpose container (1) is connected to a braking system (3, 4, 6), permits an accurate drop by virtue of the fact that it is provided with a control that has a navigation system and actuating means for a passive steering device (4, 6), that can produce lateral directional changes of container (1) during a braked descent. Preferably the container is provided on its underside with a large-volume shock absorber (7 to 10) that is under low pressure at most.

26 Claims, 2 Drawing Sheets

CONTAINER FOR AIR TRANSPORT

The invention relates to a container for air transport and for deliberate drops, for which the container is connected to a braking system.

In many applications, there is a need to drop objects, food, or the like from an aircraft in order for example to provide people in battle zones, areas without roads, etc. with food, medicine, tents or the like. It is known that containers with cargo parachutes can be dropped for this purpose, sometimes from great heights. The objects and food transported in the container must be stored in a way such that impact is absorbed in order for the materials to survive the landing in still usable form.

The greatest disadvantage of dropping containers consists in the fact that the parachutes may be affected strongly by the wind so that the aid etc. may be scattered over a large area on landing and thus not reach all of the desired recipients. It is known from recent drops of aid in war zones that not even 50% of the aid that is dropped reaches the people who need it. The drop campaigns therefore involved high losses of aid and materials.

The statement of the problem that forms the basis of the invention consists in reducing losses when dropping aid, etc. and expanding the areas in which drops from airplanes can be used.

On the basis of the statement of the problem, a container of the species recited at the outset is characterized in that it is provided with a control that has a navigation system and actuating means for a passive steering device, which can effect lateral directional changes of the container during braked descent.

The invention is based on the fact that satellite navigation systems are available in economic form and with small dimensions that can correct the direction of fall throughout the container drop and thus result in a level of accuracy with sufficiently effective steering to keep the scatter of the impact points to a maximum of 50 meters. This requires that the container be controllable laterally by the steering device in at least four directions by using the actuating means.

It is especially advantageous if the container is not only provided with a braking system but also has a shock absorber on its underside, with a large volume and with a low pressure. This shock absorber is preferably formed by a nonpressurized skirt open at the bottom and held in a curved shape that is convex toward the bottom by an inflatable frame. The skirt encloses a relatively large volume of air that is compressed when the container lands on the ground. Advantageously the tarpaulin, preferably in its upper area, is provided with air outlet openings made in the form of round openings or slots, through which the air can be braked as its escapes, resulting in the desired damping of the impact of the container on the ground. It is advantageous in this regard for the inflatable supporting structure to be inflated with a pressure that is so low that it keeps the skirt in the convex curved shape but collapses quickly on impact. This ensures that the supporting structure does not interfere with the damping of the impact by the skirt, which is made of airtight material.

In an alternative embodiment, the shock absorber can consist of a possibly multipartite annular tube with a large cross section and preferably with air outlet openings, said tube holding only a slight pressure and being free to move sideways and upward as a result of its deformation on landing.

The steering device can be formed by the braking system itself if the braking system is made steerable. For example, steering parachutes in the shape of canopies can be considered for this purpose, for example. The braking system can be supplemented by an additional braking system to ensure double security.

The steering device is preferably in the form of control flaps extending from the sides of the container. For reasons of position stabilization, it is advantageous for the control flaps to act on the upper half of the container or even above the container. The control flaps can also be articulated to the upper edge of the container. When a parachute is used as a braking system for example, the control flaps can be made small and simple, and perform a steering function practically exclusively. The control flaps can be designed to be opened by the air rushing past the falling container.

However, it is especially advantageous for the control flaps to be designed to act as a braking system as well, with the flaps having a relatively large area and extending laterally from the walls of the container. In this case also, the use of a parachute is advantageous since it ensures rapid alignment of the container into a stable dropping position. In addition the parachute can be used as an additional braking system that increases safety.

The control flaps designed to serve as a braking system as well are preferably made multipartite and provided on all four sides of the container, thus permitting steering in different ways. To increase the braking effect, the control flaps can be provided with devices that vorticize the airflow, with holes and slots for example, or with coated fabric on their ends.

A lightweight and effective design is obtained if the control flaps are made of frame parts composed of a stable lightweight material such as lightweight metal, fiber-reinforced plastic, Kevlar or the like, and have a stable fabric (for example Kevlar as well) coated to make it airtight.

It is advantageous in any case for the spaces between the control flaps to be spanned by a flexible fabric. This fabric serves to increase the braking effect but advantageously does not take part in the steering process.

The container according to the invention can be set down gently on the ground using the shock absorber system and is therefore available for many reuses. It is advantageous in this regard for all of the parts fastened to it to rest against it for shipping; for example, the control flaps can be folded against the walls of the container. Then the container itself can be collapsed and accommodate the parts attached to it in the collapsed state in a manner that saves space and protects the parts. The flexible fabric that spans the spaces between the control flaps in the vicinity of the corners of the container can be folded carefully inward. The parachute and shock absorber can advantageously be removed and stowed inside the disassembled container.

The container is advantageously provided with optical and/or acoustic signaling devices attached to it to make it easier to find in a trackless area or to alert the persons expecting the container.

The actuating means for the steering device can operate hydraulically, pneumatically, or electrically. The kinetic energy can also be obtained from the airflow during the drop.

The container according to the invention, provided with braking control flaps and an additional braking parachute as well as a shock absorber on its underside, permits a drop from any height, an accurate landing, and a practically perfect touchdown. Because of these properties, the container is also suitable for landing personnel from an aircraft and can thus replace risky individual jumping of persons with parachutes from an aircraft. This has particular advantages for landing personnel in war zones, where the troops being landed can be expected to come under fire. The risk to the landing personnel is considerably reduced by the container, which can provide protection against gunfire.

The invention will now be described in detail with reference to an embodiment shown in the drawing.

Figure 1:
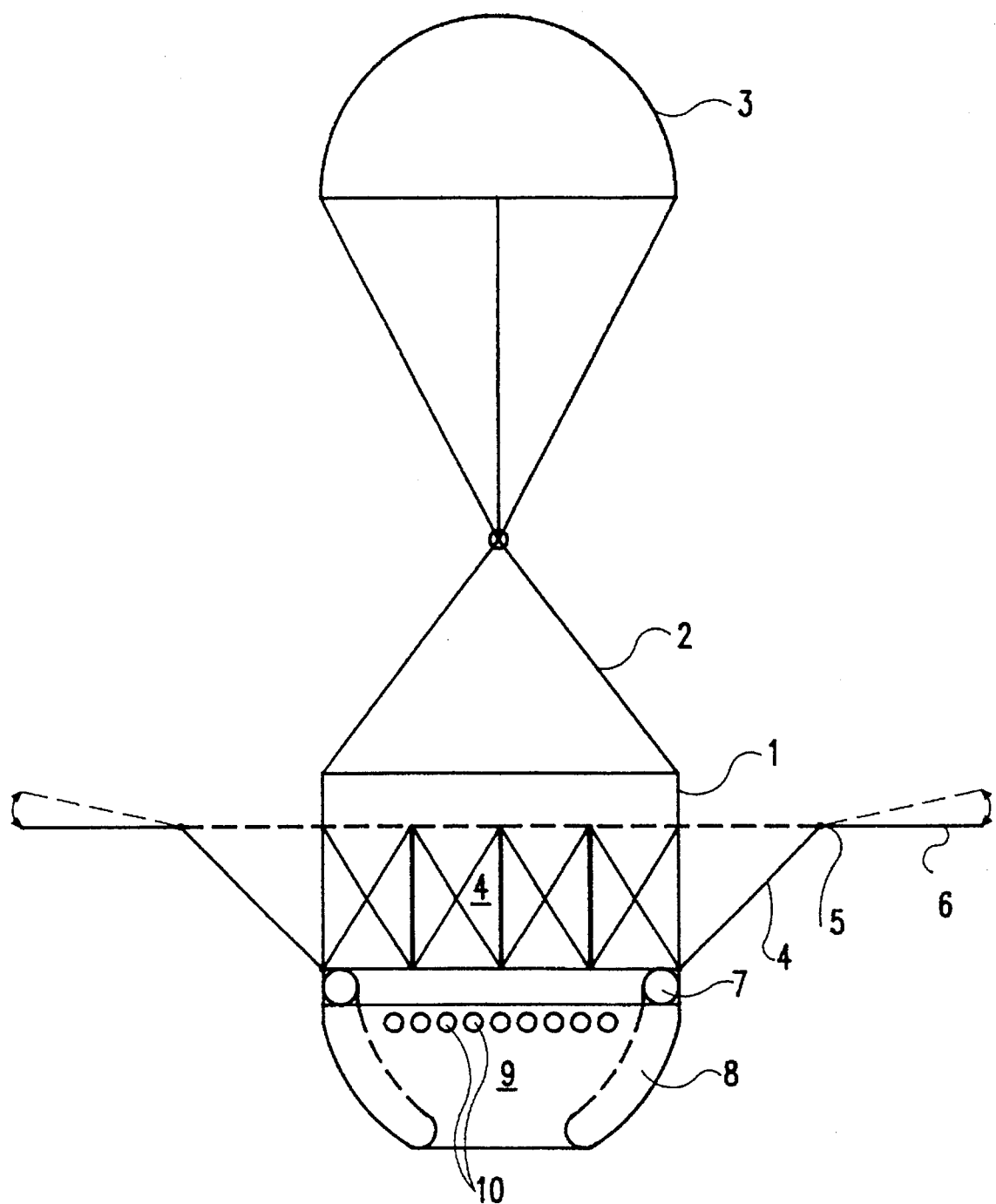
FIG. 1 shows a container suspended from a parachute with a shock absorbing device and control flaps in a side view.

The drawing shows a rectangular container 1 suspended by a cable arrangement 2 from a cargo parachute 3.

On all four sides of container 1, flaps 4 are articulated in the bottom area to extend diagonally upward and have their ends pointing away from container 1, on which rotary pivots 5 are mounted, more than half-way up the sides of container 1. Approximately horizontally projecting flaps 6 are articulated to rotary pivots 5, with the angular positions of said flaps being variable as indicated by the dashed lines in FIG. 1.

In the embodiment shown in FIG. 1, flaps 4 are aligned in a fixed position and only outer flaps 6 have their angular positions adjustable. If necessary, inner flaps 4 can also be made with adjustable angular positions to improve the steering effect.

An inflated frame 7 made of a round tube is fastened to the underside of container 1, from which curved inflated ribs 9 extend downward and ensure convex curvature of a skirt 9 open at the bottom, said skirt being located underneath frame 7 and provided with air outlet openings 10.

Figure 2:
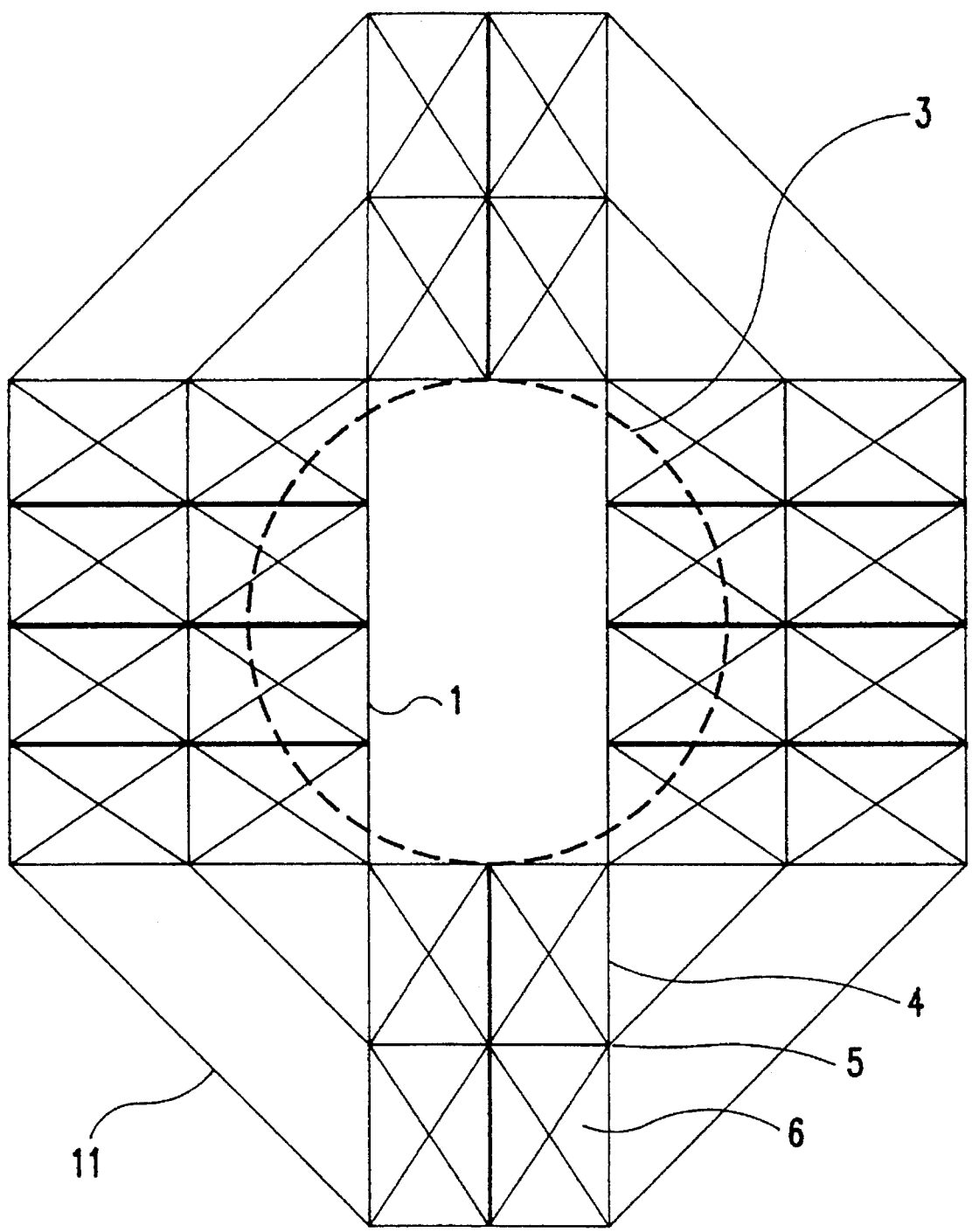
FIG. 2 is a schematic view of the control flap arrangement as seen from below.

The fall of container 1 is braked by flaps 4, 6 and parachute 3. Preferably, flaps 4 and 6 consist, as shown in FIG. 2, of a supporting frame spanned by a preferably airtight fabric. The spaces between flaps 4, 6 in the vicinity of the corners of container I are spanned diagonally by a flexible fabric 11 as shown in FIG. 2. The angular positioning of flaps 6 controls the motion of container 1 as it falls. Control is provided by a navigation system fastened to the container, said system preferably being a satellite navigation system (global positioning system—GPS) which has found wide use in aircraft navigation.

Container 1 is braked by flaps 4, 6 forming the steering device, said flaps together with flexible fabric 11 simultaneously constituting a braking system, and is brought to its desired destination with high accuracy during the fall. The remaining speed of the fall is gently braked by skirt 9 on contact with the ground, with the air volume enclosed by skirt 9 escaping mainly downward and through openings 10, so that container i is set down on the ground virtually without impact. Special shock-absorbent mounting of objects, aid, and possibly human beings transported in container 1 is therefore not necessary.

Container 1 is preferably designed to be disassembled. Flaps 4, 6 can be folded against the side walls of container 1, while inflatable frame 7 and ribs 8 can be depressurized and folded against the bottom of the container, or can be dismantled as a whole and folded up inside container 1 like parachute 3, and stowed protectively against the side walls that are folded against the bottom. Disassembled container 1 can then be shipped back like a normal pallet and used again.

I claim:

1. An apparatus for aerial delivery of cargo, comprising:
a container having a top, a bottom, and a plurality of sides;
a combined braking and steering means connected to said container comprised of (I) a plurality of control flaps projecting laterally from said plurality of sides of said container and defining an area used for braking the descent of said container that is larger than said bottom of said container, (ii) means for pivoting at least a portion of each of said plurality of control flaps to adjust a size of said area used for braking the descent of said container and steer said container in a selected direction during the descent of said container, and (iii) flexible fabric positioned between pairs of control flaps of said plurality of control flaps which are on two adjacent sides of said plurality of sides of said container, said flexible fabric serving to brake the descent of said container; and navigating control means for selectively causing pivoting of said portion of said control flaps by said means for pivoting to achieve directional changes of said container during its braked descent.

2. Apparatus according to claim 1 further comprising a large-volume shock absorber positioned on said bottom of said container.

3. Apparatus according to claim 2 wherein said shock absorber is formed by a nonpressurized skirt open at a bottom of said shock absorber and held by an inflatable supporting structure in a curved shape that is convex downward.

4. Apparatus according to claim 3 wherein said nonpressurized skirt includes air escape holes.

5. Apparatus according to claim 3 wherein said inflatable support structure is inflated with a pressure that is so low that the structure collapses quickly on impact.

6. Apparatus according to claim 1 wherein said control flaps are positioned more than half way up said container or above said top of said container.

7. Apparatus according to claim 1 wherein said control flaps are made multipartite on all four sides of said container.

8. Apparatus according to claim 1 wherein said control flaps are provided with devices that vortizice airflow.

9. Apparatus according to claim 1 wherein said control flaps are formed by stable adjustable frame parts over which a flexible fabric is stretched.

10. Apparatus according to claim 1 wherein said navigating control means includes a global positioning system device.

11. Apparatus according to claim 1 further comprising an actuating means which controls pivoting of said portion of said plurality of control flaps by mechanism selected from the group consisting of hydraulic, pneumatic and electrical.

12. Apparatus according to claim 1 wherein all parts are fastened to said container.

13. Apparatus according to claim 1 wherein said container has a size and shape that permits transport as a normal pallet.

14. Apparatus according to claim 6 wherein said control flaps are collapsible within or adjacent to said container.

15. Apparatus according to claim 1 further comprising devices fastened to said container selected from the group consisting of optical and acoustic devices.

16. An apparatus for aerial delivery of cargo, comprising:
a container having a top, a bottom, and a plurality of sides;
a combined braking and steering means connected to said container comprised of (I) a plurality of control flaps projecting laterally from said plurality of sides of said container and defining an area used for braking the descent of said container that is larger than said bottom of said container, (ii) means for pivoting at least a portion of each of said plurality of control flaps to adjust a size of said area used for braking the descent of said container and steer said container in a selected direction during the descent of said container, and (iii) a parachute positioned above said top of said container for aligning said container in a stable dropping position, said parachute defining a smaller area than said area defined by said control flaps used for braking the descent of said container; and navigating control means for selectively causing pivoting of said portion of said control flaps by said means for pivoting to achieve directional changes of said container during its braked descent.

17. Apparatus according to claim 16 further comprising a flexible fabric positioned in spaces between said control flaps are spanned by a flexible fabric (11).

18. An apparatus for aerial delivery of cargo, comprising:

a container having a top, a bottom, and a plurality of sides;

a combined braking and steering means connected to said container comprised of (I) a plurality of control flaps projecting laterally from said plurality of sides of said container and defining an area used for braking the descent of said container that is larger than said bottom of said container, and (ii) means for pivoting at least a portion of each of said plurality of control flaps to adjust a size of said area used for braking the descent of said container and steer said container in a selected direction during the descent of said container; and navigating control means for selectively causing pivoting of said portion of said control flaps by said means for pivoting to achieve directional changes of said container during its braked descent.

19. Apparatus according to claim 18 wherein said control flaps are positioned more than half way up said container of above said top of said container.

20. Apparatus according to claim 18 wherein said control flaps are made multipartite on all four sides of said container.

21. Apparatus according to claim 18 wherein said control flaps are provided with devices that vorticize air flow.

22. Apparatus according to claim 18 wherein said control flaps are formed by stable adjustable frame parts over which a flexible fabric is stretched.

23. Apparatus according to claim 18 wherein said navigating control means includes a global positioning system device.

24. Apparatus according to claim 18 wherein said control flaps are collapsible within or adjacent said container.

25. Apparatus according to claim 18 wherein container includes a compartment for storing said parachute in a collapsed state.

26. Apparatus according to claim 18 further comprising devices fastened to said container selected from the group consisting of optical and acoustic devices.

* * * * *